United States Patent [19]

Beane

[11] 4,322,232

[45] * Mar. 30, 1982

[54] FILTER BAG AND METHOD FOR SUPPRESSING ELECTROSTATIC CHARGES

[75] Inventor: Thomas F. Beane, Concord, N.C.

[73] Assignee: Beane Filter Media, Inc., Concord, N.C.

[*] Notice: The portion of the term of this patent subsequent to Aug. 18, 1998, has been disclaimed.

[21] Appl. No.: 202,133

[22] Filed: Oct. 30, 1980

Related U.S. Application Data

[63] Continuation-in-part of Ser. No. 37,286, May 9, 1979, Pat. No. 4,284,507, which is a continuation-in-part of Ser. No. 904,485, May 10, 1978.

[51] Int. Cl.³ .................. B01D 39/08; B01D 46/50
[52] U.S. Cl. ............................. 55/360; 55/381; 55/477; 55/DIG. 43; 55/DIG. 44; 66/136; 66/170; 66/194; 210/243; 210/505
[58] Field of Search .......... 55/360, 381, 477, 527–528, 55/DIG. 5, DIG. 43, DIG. 44; 66/136, 170, 194; 210/243, 505; 428/922

[56] References Cited

U.S. PATENT DOCUMENTS

| | | | |
|---|---|---|---|
| 1,928,670 | 10/1933 | McCrery | 55/360 X |
| 2,100,951 | 11/1937 | Glass et al. | 55/382 X |
| 3,288,175 | 11/1966 | Valko | 139/425 R |
| 3,986,530 | 10/1976 | Maekawa | 55/DIG. 43 |
| 4,010,004 | 3/1977 | Brown et al. | 66/194 X |
| 4,284,507 | 8/1981 | Beane | 210/435 |

FOREIGN PATENT DOCUMENTS 1110190 4/1968 United Kingdom ................ 66/194

OTHER PUBLICATIONS

"Anti Static Dust Collection", In Filtration and Separation. May/Jun. 1973, p. 364.

Primary Examiner—Kathleen J. Prunner
Attorney, Agent, or Firm—Bell, Seltzer, Park & Gibson

[57] ABSTRACT

A fabric filter bag, a method of making such a bag, and apparatus using such bags, in which the bag is a tube of yarn knit into stitches defining a ground and stitches defining terry loop pile extending from the ground. In accordance with the present invention, such a fabric filter bag, method of making a bag, and apparatus using a bag is improved by the inclusion of a conductive strand for conducting electrostatic charges otherwise accumulating on the fabric filter bag away from the bag so as to suppress accumulation or build-up of such charges.

12 Claims, 6 Drawing Figures

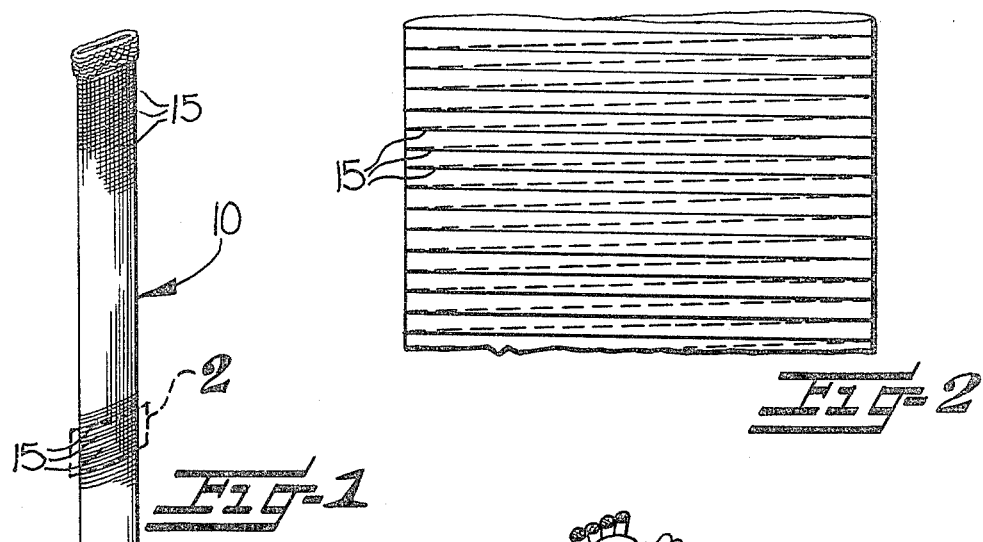
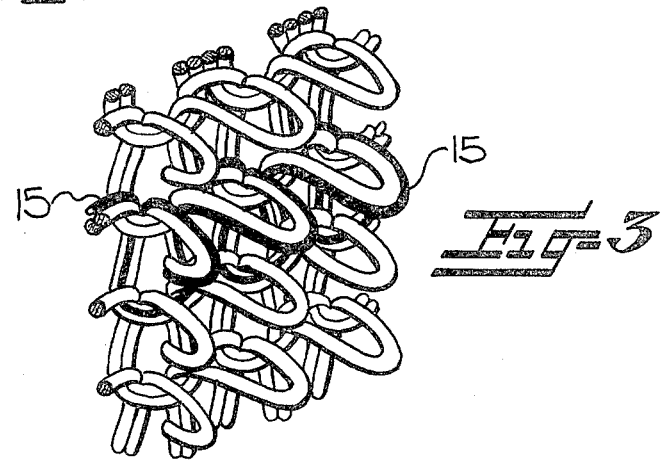
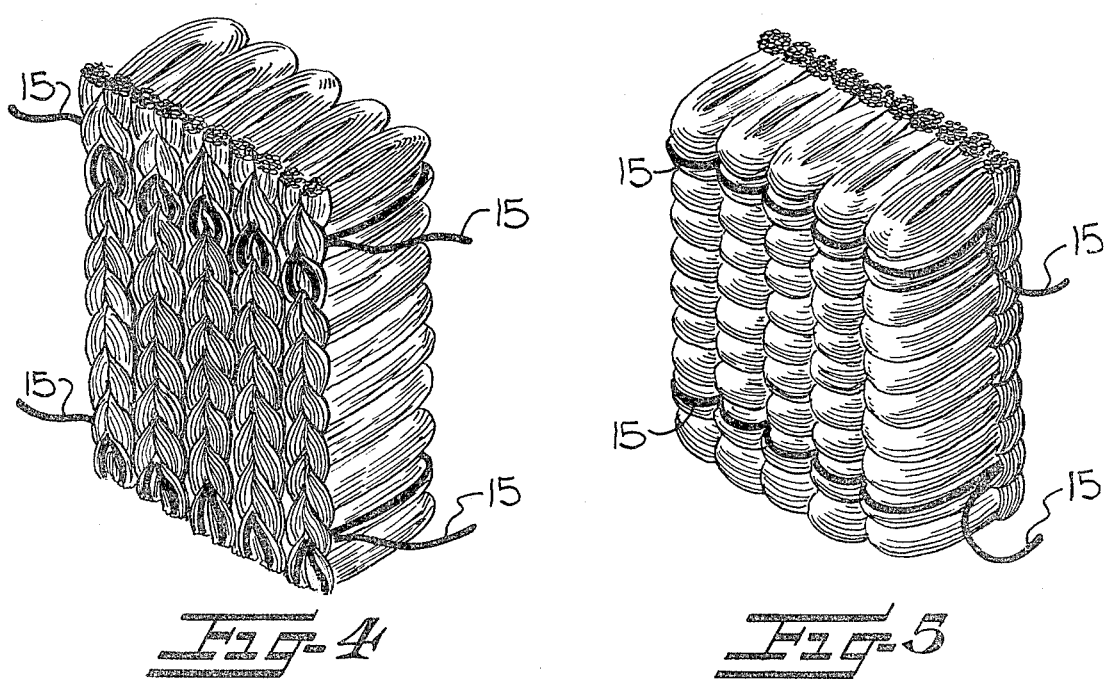

FILTER BAG AND METHOD FOR SUPPRESSING ELECTROSTATIC CHARGES

RELATED APPLICATIONS

This application is a continuation-in-part of U.S. patent application Ser. No. 37,286 filed May 9, 1979 now U.S. Pat. No. 4,284,507 issued Aug. 18, 1981 which is a continuation-in-part of application Ser. No. 904,485, filed May 10, 1978.

FIELD AND BACKGROUND OF INVENTION

Bag filter apparatus and fabric filter bags used in such apparatus have been employed for some time for separating particulate material from fluids. One generally known use for such bag filter apparatus and fabric filter bags is in the field of handling grain and grain products such as flour and meal. Fabrics have been manufactured for specific use as fabric filter bags in such fields, in order that separation of solid particulate material from air, gas and the like may be accomplished. Persons familiar with the field of filtration generally will be aware of other uses for such fabrics, filter bags and filter bag apparatus.

Particularly in certain applications for such apparatus, bags and fabrics, a significant risk is presented by the accumulation or build-up of electrostatic charges in the filtering process. Certain fluids and/or particulate substances to be removed from the fluids are or can become explosive. For example, wheat flour being separated from air streams can, under proper circumstances, become explosive. Further, friction involved in such filtration frequently gives rise to electrostatic charges which occur or appear on components of a filter apparatus. Where an explosive or potentially explosive material is being filtered in an apparatus and through the use of bags and fabrics which accumulate electrostatic charges, explosions are possible which are capable of doing severe damage to the apparatus involved and, in certain circumstances, killing persons employed in the area of the filter apparatus.

BRIEF DESCRIPTION OF INVENTION

Realizing the difficulties and deficiencies with prior filter apparatus, bags and fabrics, it is an object of the present invention to improve such structures by providing for suppressing accumulation or build-up of electrostatic charges. In realizing this object of the present invention, electrostatic charges are conducted from the fabric filter bags employed, so as to prevent or suppress accumulation or build-up of such charges. Inasmuch as such charges are suppressed or drained away, the potential of spark ignition of an explosive mixture is significantly reduced or is eliminated altogether.

Yet a further object of the present invention is to accomplish, in a method of making fabric filter bags, an improvement which facilitates safely discharging electrostatic charges otherwise possibly accumulating on fabric filter bags during filtration use. In realizing this object of the present invention, an electrically conductive strand is knitted with filamentary yarn used in forming a filter fabric. In accordance with certain features of this invention, such an electrically conductive strand takes the form of a synthetic monofilament yarn having electrically conductive characteristics, while in accordance with other aspects of this invention such an electrically conductive strand comprises a metallic staple yarn.

Yet a further object of the present invention is to provide, in a bag filter apparatus having a fabric bag which comprises a tube of circularly knitted, crimped, synthetic filamentary yarn knit into stitches defining a ground and stitches defining terry loop pile extending from the ground, a conductive strand formed with the stitches defining terry loop pile and functioning to conduct from the bag electrostatic charges otherwise possibly accumulating thereon.

BRIEF DESCRIPTION OF FIGURES

Some of the objects of the invention having been stated, other objects will appear as the description proceeds, when taken in connection with the accompanying drawings, in which FIG. 1 is an elevation view of a fabric filter bag embodying the present invention;

FIG. 2 is an enlarged elevation view of a portion of the bag of FIG. 1, taken generally as indicated in that Figure;

FIG. 3 is a schematic representation of the knit stitch structure of the fabric of FIGS. 1 and 2, particularly showing an electrically conductive strand incorporated into the fabric and bag in accordance with the present invention;

FIG. 4 is a perspective view, from a ground fabric side, of the fabric of FIGS. 1 and 2;

FIG. 5 is a view similar to FIG. 4, from the pile face of the fabric of FIGS. 1 and 2.

DETAILED DESCRIPTION OF INVENTION

Figure 6:
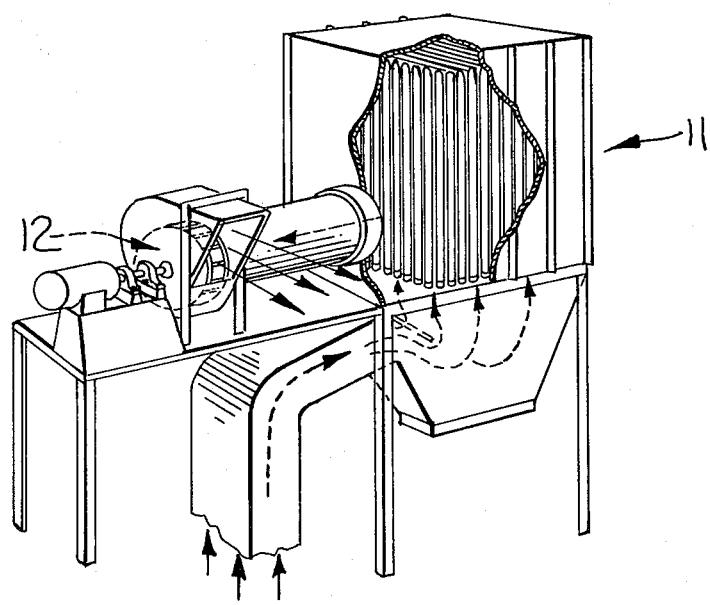
FIG. 6 is a perspective view, partly broken away, of a bag filter apparatus incorporating a filter in accordance with the present invention.

While the present invention will be described hereinafter with particular reference to the accompanying drawings, it is to be understood at the outset that persons skilled in the applicable arts will be able to modify the present invention while accomplishing the favorable result to be described. Accordingly, the following description is to be understood, from the outset, as a broad teaching disclosure directed to persons skilled in the art, and not as being restrictive upon the scope of this invention.

Referring now more particularly to the accompanying drawings, a fabric filter bag is shown in FIG. 1 and is there generally indicated at 10. The fabric filter bag in accordance with the present invention, comprises a tube of yarn having a predetermined denier in the range of from about 70 to about 300 and knit into stitches defining a ground and stitches defining terry loop pile extending from the ground to a predetermined height. The stitches of the fabric forming the tube define predetermined open areas in the range of from about 1 micron to about 100 microns. The tube is then closed at one end to form a bag. The fabric filter bag is useful in apparatus (FIG. 6) having housing means 11 for enclosing and supporting the bag and circulating means including fan means 12 or the like and inlet and outlet means for directing a flow of fluid through the housing means and the bag so as to remove particulate material from the flowing fluid. Such structures are generally known to persons skilled in the arts to which the present invention pertains and specific details of such structures may be readily determined from known prior publications. Preferably, the tube is circularly knit of crimped, synthetic filamentary yarn. Specific ranges for the denier of the crimped synthetic filamentary yarn, the porosity of the filter material as determined by the stitch structure, and the height of the terry loops may be determined by persons skilled in the appropriate arts. For example, the fabric may be formed with filamentary yarn of one hundred denier knit into stitches defining terry loop pile extending approximately two millimeters from a ground and having a porosity such as to pass particles of fifty micron size or less.

In accordance with the present invention, such a fabric filter bag 10 and apparatus using such a bag is improved by a provision of means for conducting electrostatic charges from the fabric filter bag. More particularly, the fabric filter bag includes an electrically conductive strand, as indicated in FIGS. 1 and 2. Preferably, the electrically conductive strand 15 is knitted with the filamentary yarn forming a pile, as indicated generally in FIGS. 3 through 5. In the schematic representation of FIG. 3, the electrically conductive strand 15 is indicated by darker shading than is the case for the filamentary yarn. Similarly, in the fabric views of FIGS. 4 and 5, the conductive strand 15 is knitted with a filamentary yarn forming pile.

One operating embodiment in accordance with the present invention was constructed in accordance with a method in which an electrically conductive strand 15 was knitted with the filamentary yarn forming the fabric. In particular, the electrically conductive strand was fed to an eight feed knitting machine together with a crimped, synthetic filamentary yarn so as to form the strand and the yarn together into the stitches defining terry loop pile as shown in FIGS. 3 through 5. In one embodiment in accordance with this invention, a synthetic monofilament yarn having electrically conductive characteristics due to the inclusion of conductive materials in the yarn was employed as a conductive strand. The present invention additionally contemplates that the electrically conductive strand may comprise a metallic staple yarn, fed into the knitting machine with a synthetic filamentary yarn. Such a metallic staple yarn may be formed using relatively short lengths of metallic strands, and will perform the conductive function required in accordance with the present invention. The electrically conductive strand may also be formed by lamination with vacuum metalized foils.

Where the fabric filter bag 10 is manufactured as a seamless bag, using a circular knitting machine, the electrically conductive strand 15 is knitted into courses of the fabric so as to extend essentially continuously throughout the length of the bag and spiral about the circumference thereof. Thus, electrostatic charges otherwise accumulating at any point on the surface of the bag are conducted through the yarn to a portion of the bag gripped by mounting means which holds the bag in place during use in a filtering apparatus. Where the fabric is formed in a larger diameter which is then slit, opened and sewn into a bag, similar conductance of electrostatic charges to a ground point in the apparatus may be accomplished by seaming the bag with an electrically conductive strand of the same general type knitted into the fabric. In either instance, the risks associated with sparking from accumulated electrostatic charges are eliminated.

In the drawings and specification, there has been set forth a preferred embodiment of the invention, and although specific terms are employed, they are used in a generic and descriptive sense only and not for purposes of limitation.

That which is claimed is:

1. In a method of making fabric filter bags which includes circularly knitting crimped, synthetic yarn having a denier in the range of from about 70 to about 300 into a tube of predetermined diameter and at least a predetermined length while forming the yarn into stitches defining a ground and stitches defining terry loop pile extending from the ground to a predetermined height, the stitches defining open areas in the range of from about 1 micron to about 100 microns, and then sewing the fabric into a bag, an improvement which facilitates safely discharging electrostatic charges otherwise accumulating on the fabric filter bags during filtration use, the improvement comprising the step of knitting with the filamentary yarn an electrically conductive strand.

2. A method according to claim 1 wherein the step of knitting an electrically conductive strand comprises feeding the electrically conductive strand with a yarn while forming the strand and the yarn into the stitches defining terry loop pile.

3. A method according to one of claims 1 and 2 wherein the electrically conductive strand comprises a synthetic monofilament strand having electrically conductive characteristics.

4. A method according to one of claims 1 and 2 wherein the electrically conductive strand comprises a metallic staple strand.

5. In a fabric filter bag comprising a tube of circularly knitted, crimped, synthetic yarn having a denier in the range of from about 70 to about 300 and knit into stitches defining a ground and stitches defining terry loop pile extending from the ground to a predetermined height, the stitches defining open areas in the range of from about 1 micron to about 100 microns, the tube being closed at one end, an improvement which facilitates safely discharging electrostatic charges otherwise accumulating on the fabric filter bag during filtration use, the improvement comprising an electrically conductive strand knitted with the yarn for conducting electrostatic charges from the fabric filter bag.

6. A fabric filter bag according to claim 5, wherein the electrically conductive strand is knitted with a yarn into the stitches defining terry loop pile.

7. A fabric filter bag according to one of claims 5 and 6 wherein the electrically conductive strand is a synthetic monofilament strand having electrically conductive characteristics.

8. A fabric filter bag according to one of claims 5 and 6 wherein the electrically conductive strand is a metallic staple strand.

9. In a bag filter apparatus having a fabric bag for filtering material from flowing fluid, housing means for enclosing and supporting said bag, and circulating means including inlet and outlet means for directing a flow of fluid through said housing means and said bag, the bag comprising a tube of circularly knitted, crimped, synthetic yarn having a denier in the range of from about 70 to about 300 and knit into stitches defining a ground and stitches defining terry loop pile extending from the ground to a predetermined height, the stitches defining open areas in the range of from about 1 micron to about 100 microns the tube being closed at one end, an improvement which facilitates safely discharging electrostatic charges otherwise accumulating on the fabric filter bag during filtration use, the improvement comprising an electrically conductive strand knitted with the yarn for conducting from the bag electrostatic charges otherwise accumulating thereon.

10. An apparatus according to claim 9 wherein the electrically conductive strand is knitted with a yarn into the stitches defining terry loop pile.

11. An apparatus according to one of claims 9 and 10 wherein the electrically conductive strand is a synthetic monofilament strand having electrically conductive characteristics.

12. An apparatus according to one of claims 9 and 10 wherein the electrically conductive strand is a metallic staple strand.

* * * * *